US008328686B2

(12) United States Patent
Kobayashi et al.

(10) Patent No.: US 8,328,686 B2
(45) Date of Patent: Dec. 11, 2012

(54) SHIFT CONTROLLER

(75) Inventors: Masaki Kobayashi, Saitama (JP);
Kenichi Machida, Saitama (JP); Eiji Kittaka, Saitama (JP); Seiji Hamaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 568 days.

(21) Appl. No.: 12/553,063

(22) Filed: Sep. 2, 2009

(65) Prior Publication Data
US 2010/0081547 A1 Apr. 1, 2010

(30) Foreign Application Priority Data

Sep. 29, 2008 (JP) ................. 2008-250347
Sep. 29, 2008 (JP) ................. 2008-250348

(51) Int. Cl.
*B60W 10/00* (2006.01)
*B60W 10/02* (2006.01)
*F16H 59/00* (2006.01)

(52) U.S. Cl. ........... 477/79; 477/98; 477/180; 74/337.5; 192/3.57

(58) Field of Classification Search ........ 477/79, 477/174, 180; 74/330, 331, 335, 337.5; 192/3.54, 192/3.55, 3.57, 3.58, 3.61
See application file for complete search history.

(56) References Cited

U.S. PATENT DOCUMENTS

| 2004/0166990 A1* | 8/2004 | Buchanan et al. | ........... 477/174 |
| 2009/0078069 A1* | 3/2009 | Nedachi et al. | ................. 74/330 |
| 2009/0078072 A1* | 3/2009 | Tsukada et al. | ................. 74/335 |
| 2009/0145253 A1* | 6/2009 | Katakura et al. | ................ 74/335 |

FOREIGN PATENT DOCUMENTS

JP 2007-092907 4/2007

* cited by examiner

*Primary Examiner* — Roger Pang
(74) *Attorney, Agent, or Firm* — Birch, Stewart, Kolasch & Birch, LLP

(57) ABSTRACT

A shift controller with a first clutch CL1 that connects/disconnects the torque to a first main shaft and a second clutch CL2 connects/disconnects the torque to a second main shaft. A transmission is configured so that dog clutches DC1, DC2 for first speed and for second speed are engaged in a predetermined turned position P1-2 of a shift drum. A linear solenoid valve that supplies clutch oil pressure, a shift solenoid that switches a destination of the supply oil pressure between both clutches and a controller that controls the supply oil pressure and the turning of the shift drum are provided. The controller supplies predetermined oil pressure P1 to the CL2 in neutral, switches the destination of supply oil pressure to the CL1 when the shift drum is turned to P1-2 according to a shift instruction to engage gears and supplies maximum oil pressure P3 to the CL1 in predetermined time ta.

9 Claims, 10 Drawing Sheets

SHIFT CONTROLLER

CROSS-REFERENCE TO RELATED APPLICATION

The present application claims priority under 35 U.S.C. §119 to Japanese Patent Application Nos: 2008-250348 and 250347, both filed Sep. 29, 2008, the entire contents of which are hereby incorporated by reference.

BACKGROUND OF THE INVENTION

1. Field of the Invention

The present invention relates to a shift controller, particularly relates to a shift controller of a transmission provided with a twin clutch the engagement/the disengagement of which is controlled by the supply of oil pressure.

2. Description of Background Art

Heretofore, a twin clutch type transmission which is provided with a pair of clutches (a first clutch, a second clutch) between a crankshaft and a main shaft of the transmission and which enables a sequential shift without interrupting the transmission of the driving force of an engine by controlling the alternate engagement/the disengagement of the first clutch and the second clutch in parallel with operation for a shift by an actuator is known.

In JP-A No. 2007-92907, a twin clutch type transmission that controls the engagement/disengagement of two clutches by a single linear solenoid valve that controls supply oil pressure from an oil pressure supply source and a shift valve that switches a destination of supply oil pressure to either of the first or the second clutch is disclosed.

In the twin clutch type transmission disclosed in the JP-A No. 2007-92907, it is conceivable that the engagement of both a dog clutch for first speed and a dog clutch for second speed is set in switching from a neutral condition to a state in which gears are engaged so as to enable the execution of a shift between the first speed and the second speed by only control over the engagement/disengagement of the clutches. However, when the simultaneous engagement of a pair of dog clutches is tried according to the turning of a shift drum, a situation in which a dog tooth (a dowel) is not smoothly fitted into a dog slit (a slit) is apt to occur. At this time, when the two clutches are disengaged and the rotation of a main shaft is stopped, measures such as pressing and dragging a vehicle and turning a countershaft of the transmission are required so as to release the situation.

In addition, as disclosed in JP-A No. 2007-92907 JP-A No. 2007-92907, a shift from a state in which predetermined speed is established is executed by switching a destination of supply oil pressure from engaged one clutch to the other disengaged clutch. At this time, in control that the destination of supply oil pressure is only switched with maximum oil pressure applied, a shift shock may be increased. For a method for coping with this situation, it is conceivable that after oil pressure applied to one clutch is once removed, a destination of supply oil pressure is switched and the supply to the other clutch is started, however, this method has a problem that it is apt to take much time to shift.

SUMMARY AND OBJECTS OF THE INVENTION

One object of the present invention is to address the problem of the related art and to provide a shift controller that enables the secure engagement of dog clutches for first speed and for second speed in switching from a neutral condition to a state in which gears are engaged. Another object of the present invention is to provide a shift controller that can make the reduction of shifting time and the reduction of a shift shock compatible by controlling clutch oil pressure in a shift.

The present invention is based upon a shift controller of a twin clutch type transmission which is provided with the transmission having plural gear pairs according to speed between a main shaft and a countershaft and a twin clutch configured by a first clutch and a second clutch respectively arranged on the main shaft and in which torque of an engine is connected/disconnected between the engine and the transmission by the twin clutch. In a first aspect of the present invention, the main shaft is configured by a first main shaft that supports plural gears for odd-numbered speeds and a second main shaft that supports plural gears for even-numbered speeds. The first clutch connects/disconnects the torque transmitted to the first main shaft and the second clutch connects/disconnects the torque transmitted to the second main shaft. The transmission is configured so that a dog clutch for first speed that transmits the torque of the first-speed gear and a dog clutch for second speed that transmits the torque of the second-speed gear are both engaged with a predetermined gear when a shift drum is turned to a predetermined position.

A single oil pressure supply means supplies oil pressure for connecting the twin clutch, and an oil pressure supply destination switching means switches a destination of oil pressure supplied from the oil pressure supply means between the first clutch and the second clutch.

A controller controls oil pressure supplied to the twin clutch and turning of the shift drum are provided and the controller supplies predetermined oil pressure to either of the first clutch or the second clutch in neutral, turns either corresponding to one clutch of the first main shaft or the second main shaft, starts the turning of the shift drum to the predetermined position when a shift instruction from a neutral condition to a state in which gears are engaged is output, instructs the switching unit to switch a destination of supply oil pressure to the other of the first clutch or the second clutch and supplies larger oil pressure than the predetermined oil pressure to the other clutch during predetermined time until the other of the first main shaft or the second main shaft is turned.

In a second aspect of the present invention, a second aspect that the larger oil pressure than the predetermined oil pressure is maximum oil pressure by the oil pressure supply means.

In a third aspect of the present invention, the predetermined time is finished before timing at which the dog clutch for first speed and the dog clutch for second speed are engaged.

In a fourth aspect of the present invention, after the predetermined time elapses, oil pressure smaller than the maximum oil pressure and larger than the predetermined oil pressure is supplied.

In a fifth aspect of the present invention, the clutch that supplies predetermined oil pressure in neutral is the second clutch.

In a sixth aspect of the present invention, an oil temperature sensor that detects the temperature of oil supplied to the clutch and a data table for deriving the predetermined time based upon the oil temperature are provided.

In a seventh aspect of the present invention, a shift controller of a twin clutch type transmission which is provided with the transmission having plural gear pairs according to speed between a main shaft and a countershaft and a twin clutch configured by a first multiple disc clutch and a second multiple disc clutch respectively arranged on the main shaft and respectively having plural clutch plates and in which torque of an engine is connected/disconnected between the engine and the transmission by the twin clutch. The main shaft is configured by a first main shaft that supports plural gears for odd-numbered speeds and a second main shaft that supports plural gears for even-numbered speeds.

The first clutch connects/disconnects the torque transmitted to the first main shaft, the second clutch connects/disconnects the torque transmitted to the second main shaft. The transmission enables a shift between adjacent speeds by switching the engagement/the disengagement of the twin clutch.

A single oil pressure supplying means supplies oil pressure for controlling the engagement/the disengagement of the twin clutch, and an oil pressure supply destination switching means switches a destination of oil pressure supplied from the oil pressure supplying means between the first clutch and the second clutch.

A controller controls the oil pressure supplying means and the oil pressure supply destination switching means are provided. The controller switches the destination of supply oil pressure to the other clutch by the oil pressure supply destination switching means when a shift instruction is output while predetermined speed is selected and maximum oil pressure is supplied to either of the first clutch or the second clutch and supplies the maximum oil pressure in only predetermined time until frictional force is generated in the clutch plates.

In an eighth aspect of the present invention, an oil temperature sensor that detects the temperature of oil supplied to the clutch from the oil pressure supplying means, an engine speed sensor that detects engine speed and a data table for deriving the predetermined time based upon the engine speed ant the oil temperature are provided.

In a ninth aspect of the present invention, the controller supplies second oil pressure smaller than the maximum oil pressure in only second predetermined time after the predetermined time elapses.

In a tenth aspect of the present invention, the second predetermined time is calculated based upon the predetermined time.

In an eleventh aspect of the present invention, the second oil pressure is predetermined.

In a twelfth aspect of the present invention, the data table enables deriving an estimate of oil pressure generated in the twin clutch based upon the engine speed and the oil temperature.

In a thirteenth aspect of the present invention, the controller executes oil pressure control for gradually raising oil pressure from third oil pressure smaller than the second oil pressure in third predetermined time set after the second predetermined time elapses.

Effects of the invention include the following:

According to the first aspect, as the controller supplies predetermined oil pressure to either of the first clutch or the second clutch in neutral, turns either corresponding to one clutch of the first main shaft or the second main shaft, makes the shift drum start the turning to the predetermined position when the shift instruction from the neutral condition to the state in which gears are engaged is output, switches the destination of supply oil pressure to the other of the first clutch or the second clutch by the switching means and supplies the larger oil pressure than the predetermined oil pressure to the other clutch during the predetermined time until the other of the first main shaft or the second main shaft is turned, one of the first main shaft or the second main shaft can be turned together with the rotation of the crankshaft of the engine even in neutral.

When the shift instruction from the neutral condition to the state in which gears are engaged is output, the destination of supply oil pressure is switched and the other of the first main shaft or the second main shaft is also turned together. Therefore, immediately after the shift instruction, a period in which both the first main shaft and the second main shaft are turned together with the torque of the engine can be provided. Hereby, even when the shift drum is turned to the predetermined position from the neutral condition and the dog clutch for first speed and the dog clutch for second speed are simultaneously fitted (engaged), the dog clutches can be smoothly engaged.

According to the second aspect, as the larger oil pressure than the predetermined oil pressure is maximum oil pressure by the oil pressure supply means, time until the first main shaft or the second main shaft starts to be turned together can be reduced when the destination of supply oil pressure is switched according to the shift instruction from the neutral condition to the state in which gears are engaged. Hereby, while the turning of either of the first main shaft or the second main shaft turned because of inertia is maintained, the other of the first main shaft or the second main shaft can be also easily turned together.

According to the third aspect, as the predetermined time is finished before the timing at which the dog clutch for first speed and the dog clutch for second speed are engaged, clutch oil pressure when the dog clutches are engaged can be prevented from being too large. Hereby, the engagement of the dog clutch can be prevented from being difficult because the revolution speed of the main shaft is too fast.

According to the fourth aspect, as the oil pressure smaller than the maximum oil pressure and larger than the predetermined oil pressure is supplied after the predetermined time elapses, the dog clutch can be engaged in a state in which a degree of the engagement of the clutch is damped after the first main shaft or the second main shaft is promptly turned together by the maximum oil pressure. Hereby, a shift shock when the shift drum is turned from the neutral condition to the predetermined position can be reduced.

According to the fifth aspect, as the clutch that supplies the predetermined oil pressure in neutral is the second clutch, the supply of oil pressure to the first clutch corresponding to the first-speed gear is started by switching the destination of supply oil pressure according to the shift instruction from the neutral condition to the state in which gears are engaged and the first-speed gear can be selected without switching the destination of supply oil pressure after the dog clutch is engaged. Hereby, responsiveness to the shift instruction from the neutral condition to the state in which gears are engaged can be enhanced.

According to the sixth aspect, as the oil temperature sensor that detects the temperature of oil supplied to the clutch and the data table for deriving predetermined time based upon the oil temperature are provided, the derivation of the predetermined time is simplified and a load of a processor can be reduced.

According to the seventh aspect, as the controller executes first control that it switches the destination of supply oil pressure to the other clutch by the oil pressure supply destination switching means when a shift instruction is output while predetermined speed is selected and maximum oil pressure is supplied to either of the first clutch or the second clutch and supplies the maximum oil pressure in only the predetermined time until frictional force is generated in the clutch plates, an ineffective stroke of the other clutch can be reduced to the shortest time at the initial stage of the shift at which the destination of supply oil pressure is switched from one clutch to the other clutch. Hereby, a shift shock can be reduced without extending time until the shift is completed.

According to the eighth aspect, as the oil temperature sensor that detects the temperature of oil supplied to the clutch from the oil pressure supplying means, the engine speed sensor that detects engine speed and the data table for deriving the predetermined time based upon the engine speed and the oil temperature are provided, the predetermined time in which the maximum oil pressure is supplied can be easily derived. When the oil temperature is low and the viscosity of oil is high and when engine speed is low, setting for extending the predetermined time may be also made and a process for reducing the ineffective stroke in accordance with a state of the transmission can be executed.

According to the ninth aspect, as the controller executes second control that it supplies the second oil pressure smaller than the maximum oil pressure in only the second predetermined time after the predetermined time elapses, the process for reducing the ineffective stroke is executed at two stages of the maximum velocity and the velocity lower than it and even if there is dispersion among ineffective strokes of the clutch due to an error among products, the dispersion is absorbed by the process at the second stage and the ineffective stroke can be securely reduced.

According to the tenth aspect, as the second predetermined time is calculated based upon predetermined time derived from the data table, the process for deriving the predetermined time using the data table is finished only once and a load of operation can be reduced.

According to the eleventh aspect, as the second oil pressure is predetermined, a value of oil pressure to be supplied during the second predetermined time is not required to be calculated and a load of operation can be reduced.

According to the twelfth aspect, as the data table enables deriving the estimate of oil pressure generated in the twin clutch based upon the engine speed and the oil temperature, no oil pressure sensor for detecting oil pressure generated in the twin clutch is required, the number of parts of the shift controller is reduced, and the configuration can be simplified.

According to the thirteenth aspect, as the controller executes the third control that it supplies oil pressure to gradually raise the oil pressure from the third oil pressure smaller than the second oil pressure in the third predetermined time set after the second predetermined time elapses, the clutch in which the process for reducing the ineffective stroke is completed is gradually shifted into an engaged condition after the process for reducing the ineffective stroke at the two stages is completed and the shift can be smoothly completed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
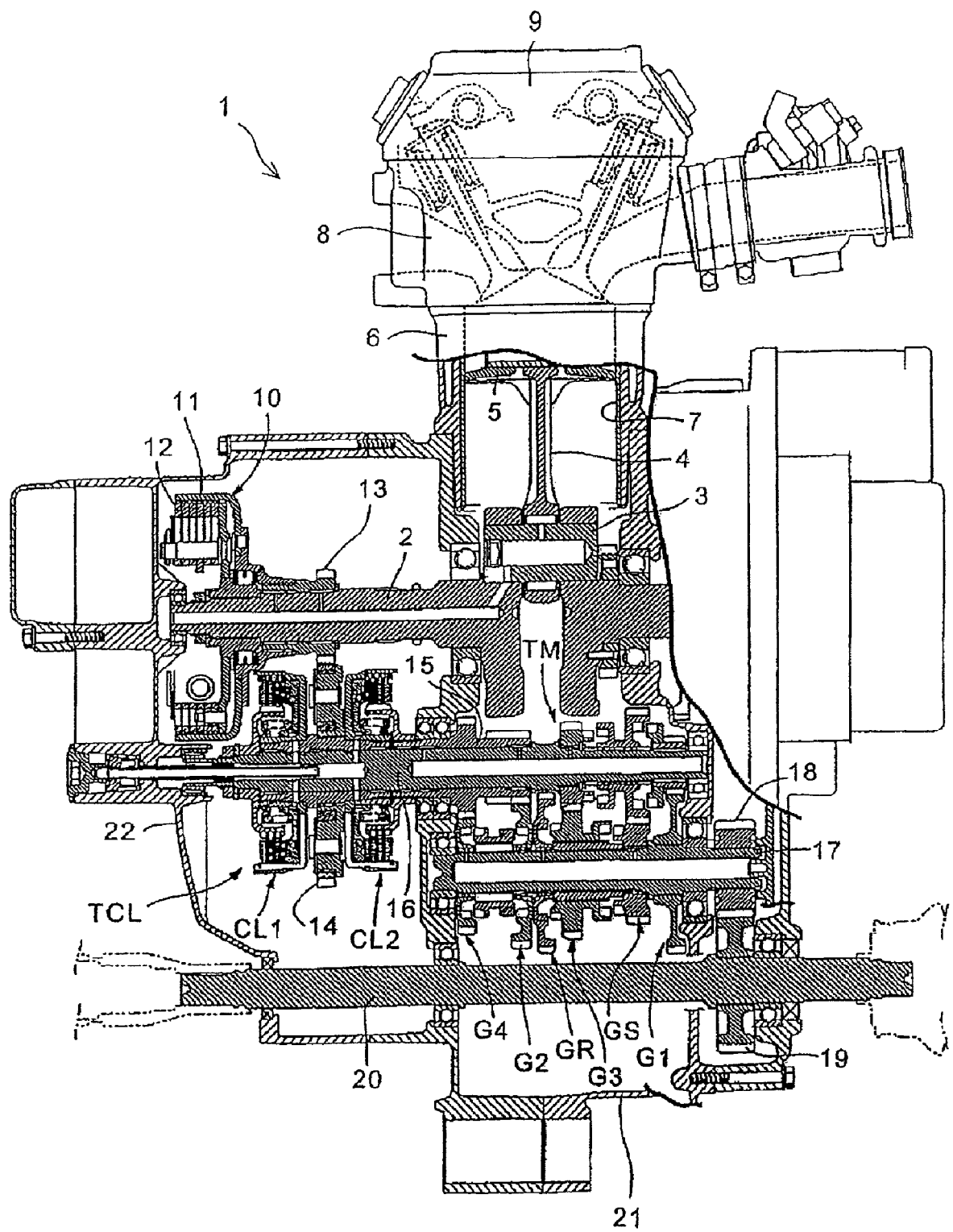
FIG. 1 is a sectional view showing an engine to which a shift controller equivalent to one embodiment of the present invention is applied.

Referring to the drawings, a preferred embodiment of the present invention will be described in detail below. FIG. 1 is a sectional view showing an engine 1 to which a shift controller equivalent to one embodiment of the present invention is applied. A transmission TM which has five speeds in forward travel and which has one speed in reverse travel is integrated with the engine 1 as a power source of a saddle-ride type four-wheel vehicle and others. A connecting rod 4 is turnably supported via a crankpin 3 by a crankshaft 2 rotatably journaled by a crankcase 21. A piston 5 slid inside a sleeve 7 provided inside a cylinder 6 is attached to the other end of the connecting rod 4, and a cylinder head 8 and a cylinder head cover 9 respectively housing a valve mechanism that controls the intake and the exhaust of air-fuel mixture and combustion gas are fixed on the upside of the cylinder 6.

A starting clutch 10 provided with a clutch outer 11 and a clutch shoe 12 is provided at a left end of the crankshaft 2. In the starting clutch 10, when engine speed, that is, the number of revolutions of the crankshaft 2 exceeds a predetermined value (for example, 2000 r.p.m.), frictional force is produced between the clutch outer 11 turned together with the crankshaft 2 and the clutch shoe 12, and hereby, torque is transmitted to an output gear 13 fixed to the clutch outer 11.

The torque transmitted to the output gear 13 is transmitted to an output shaft 20 via a transmission TM including a primary gear 14, a twin clutch TCL configured by a first clutch CL1 and a second clutch CL2, an inner primary shaft as a main shaft (an inner main shaft, equivalent to a first main shaft) 16, an outer primary shaft (an outer main shaft, equivalent to a second main shaft) 15 turnably journaled to the inner primary shaft and gear pairs G1 to G5, GR provided between the primary shafts 15, 16 and a countershaft 17, an output gear on the driving side 18 and an output gear on the driven side 19. As for the twin clutch TCL, the first clutch CL1 and the second clutch CL2 are arranged back to back with the primary gear 14 between the first and second clutches and a hydraulic path for driving the twin clutch is provided in an axial position of the main shaft inside a left case 22 of the crankcase 21.

Figure 2:
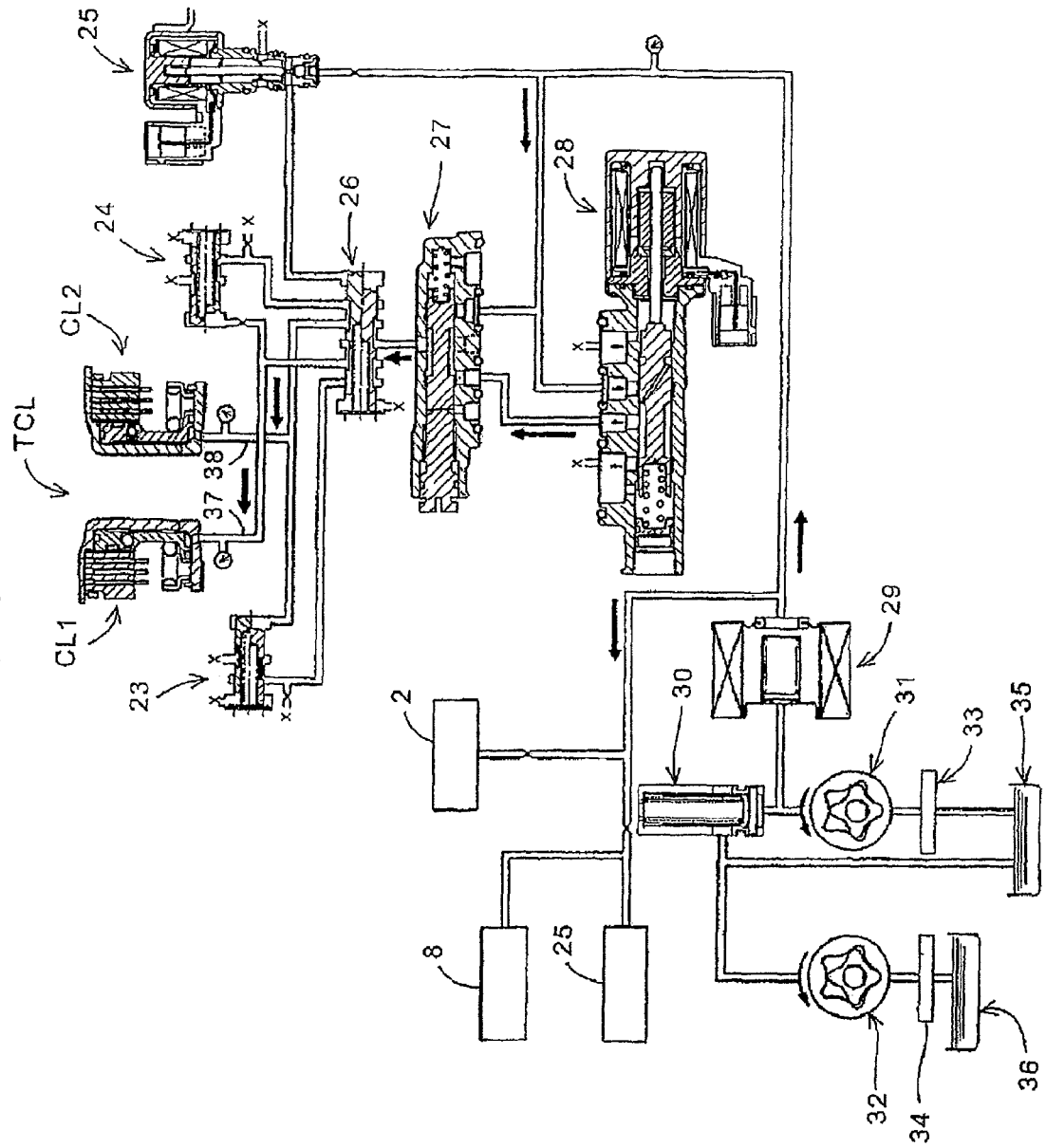
FIG. 2 is a block diagram showing oil path structure for driving a twin clutch.

FIG. 2 is a block diagram showing oil path structure for driving the hydraulic twin clutch TCL. The same reference numeral as the above-mentioned one denotes the same or the similar part. Oil pressure for driving the first clutch CL1 and the second clutch CL2 is generated by a trochoid feed pump 31 rotated according to the rotation of the crankshaft 2. Oil pumped up from an oil tank 35 via an oil strainer 33 by the feed pump 31 is supplied to the crankshaft 2, the cylinder head 8 and each lubricating path of the transmission TM via a relief valve 30 that holds the oil pressure at a predetermined value and an oil filter 29. In this embodiment, a second pump 32 that pumps up oil from an oil pan 36 via an oil strainer 34 is also provided.

A part of the oil pressure generated by the feed pump 31 is supplied to a hydraulic circuit for driving the clutch including a linear solenoid valve 28, an emergency shut-off valve 27, a shift solenoid 25, a shift valve 26, orifice control valves 23, 24, the first clutch CL1 and the second clutch CL2. That is, in this hydraulic mechanism, a system sharing engine lubricating oil and clutch driving oil is adopted.

In this hydraulic mechanism, the connection to the first clutch CL1 and to the second clutch CL2 is alternately switched by turning on/off electricity to the shift solenoid 25. The linear solenoid valve 28 can control oil pressure generated by the feed pump 31 and can optionally vary oil pressure supplied to both clutches. That is, oil pressure supplying means is configured by the feed pump 31 and the single linear solenoid valve 28.

Oil pressure supplied from the linear solenoid valve 28 is introduced to the shift valve 26 via the emergency shut-off valve 27. The emergency shut-off off valve 27 can directly supply oil to the shift valve 26 without passing the linear solenoid valve 28 by manually switching an oil passage and opening a bypass circuit when oil pressure cannot be supplied because of a problem of the linear solenoid valve 28 and others.

The shift solenoid 25 is opened when it is energized and when the shift solenoid is opened, working fluid for switching the oil passage is supplied to the shift valve 26. Hereby, the shift valve 26 switches a destination to which the oil pressure from the linear solenoid valve 28 is supplied to the first clutch CL1 so as to connect to the first clutch CL1. That is, oil pressure supply destination switching means is configured by the shift solenoid 25 and the shift valve 26.

In the meantime, the shift solenoid 25 is closed when electricity is turned off. Hereby, the shift valve 26 switches the destination of the supply of the oil pressure to the second clutch CL2 so as to make the second clutch CL2 connected. The orifice control valves 23, 24 are provided with a function of reducing shift shock by relieving surplus oil pressure after each clutch is connected.

Figure 3:
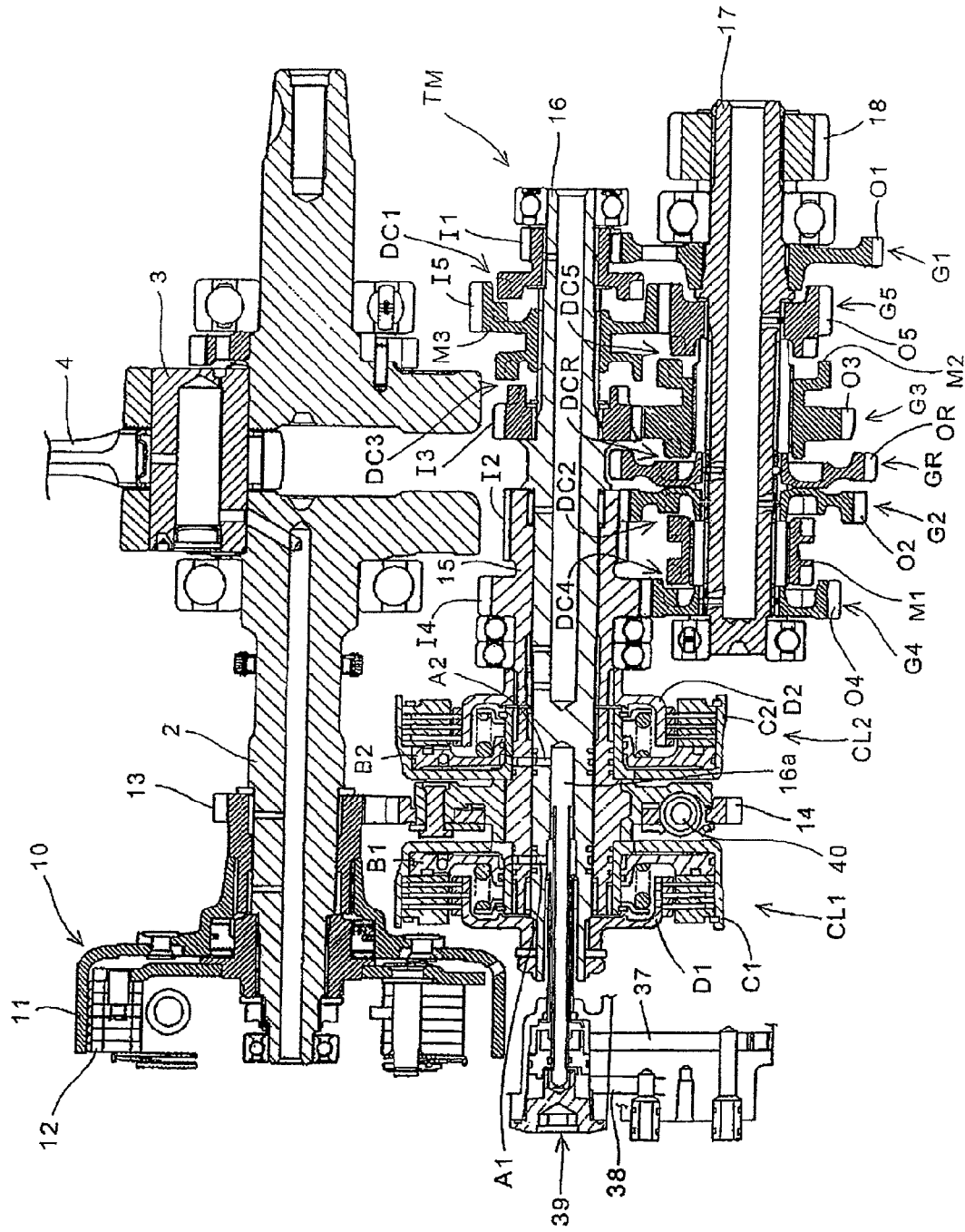
FIG. 3 is a sectional view enlarging a part of FIG. 1.

FIG. 3 is a sectional view enlarging a part of FIG. 1. The same reference numeral as the above-mentioned one denotes the same or the similar part. The transmission TM is a sequential type multispeed transmission having five speeds in forward travel and having one speed in reverse travel and a shift between each speed is executed by the combination of turning on/off the oil pressure applied to the twin clutch TCL and the sliding in an axial direction of a first sleeve M1, a second sleeve M2 and a third sleeve M3 as a shift mechanism.

In the primary gear 14 turnably connected to the outer primary shaft 15 and the inner primary shaft 16, a shock absorption mechanism by a spring 40 is incorporated into absorb a shock when driving force is transmitted. In this embodiment, the first clutch CL1 and the second clutch CL2 have the same configuration by the combination of the same parts. The configuration of the first clutch CL1 as a representative will be described below and the corresponding part of the second clutch CL2 will be shown in parentheses.

A piston B1 (B2) inserted in an airtight condition via an oil seal is provided to the first clutch CL1 (the second clutch CL2) at the bottom of a clutch case C1 (C2) fixed to the primary gear 14. The piston B1 (B2) is pushed out leftward in drawing (rightward) when working oil is fed under pressure from an oil passage A1 (A2) provided to the inner primary shaft 16 and in the meantime, the piston is turned to an original position by the resilience of a clutch spring when supplied oil pressure is reduced.

On the left side in drawing (On the right side) of the piston B1 (B2), a clutch plate unit configured by three friction discs fitted to the clutch case C1 (C2) so that each friction disc cannot be turned and three clutch plates fitted to an arm D1 (D2) so that each clutch plate cannot be turned is arranged, and when the piston B1 (B2) is pushed out leftward in drawing (rightward), frictional force is generated between the clutch plates. Unless the piston B1 (B2) is pushed out by oil pressure, the torque of the primary gear 14 only turns the clutch case C1 (C2) because of the above-mentioned configuration, however, when oil pressure is supplied and the piston B1 (B2) is pushed out, the arm D1 (D2) is turned. At this time, partial clutch engagement can be also produced by hydraulic control over the linear solenoid valve 28.

An oil passage distributor 39 formed by a double tube is inserted and fixed into/to an oil gallery 16a provided on an axis of the inner primary shaft 16. Hereby, oil pressure applied to a supply oil passage 37 drives the piston B1 of the first clutch CL1 from an outer tube of the oil passage distributor 39 via the oil passage A1 and in the meantime, oil pressure applied to a supply oil passage 38 drives the piston B2 of the second clutch CL2 from between the outer tube and an inner tube of the oil passage distributor 39 via the oil passage A2.

The arm D1 on the side of the first clutch CL1 is fixed to a left end in drawing, of the inner primary shaft 16 and the arm D2 on the side of the second clutch CL2 is fixed to the outer primary shaft 15. A first speed driving gear 11 and a third speed driving gear 13 are attached to the inner primary shaft 16 turnably in a circumferential direction and so that they cannot be axially slid, and the third sleeve M3 on which a fifth speed driving gear 15 is formed is attached between both gears slidably in the axial direction and so that the third sleeve cannot be turned in the circumferential direction.

In the meantime, a second speed driving gear 12 and a fourth speed driving gear 14 are formed on the outer primary shaft 15. The first sleeve M1 which is slidable in the axial direction and which cannot be turned in the circumferential direction, a first speed driven gear O1 which cannot be slid in the axial direction and which cannot be turned in the circumferential direction, a second speed driven gear O2 which cannot be slid in the axial direction and which is turnable in the circumferential direction, the second sleeve M2 on which a third speed driven gear O3 is formed, which is slidable in the axial direction and which cannot be turned in the circumferential direction, a fourth speed driven gear O4 which cannot be slid in the axial direction and which is turnable in the circumferential direction and a fifth speed driven gear O5 which cannot be slid in the axial direction and which is turnable in the circumferential direction are respectively attached to the countershaft 17.

The first sleeve M1 to the third sleeve M3 are configured so that they connect/disconnect each dog clutch provided between each sleeve and its adjacent gear by being respectively axially slid. The dog clutch is formed by engaging a dog tooth or a dog slit provided to the sleeve and a dog slit or a dog tooth provided to the gear adjacent to the sleeve. The dog clutch is a well-known mechanism that enables the transmission of motive power between gears coaxially adjacent by engaging the dog tooth (the dowel) and the dog slit (the slit). In the transmission TM in this embodiment, dog clutches DC1 to DC5 for first speed to fifth speed and a dog clutch DCR for a reverse gear are provided. The transmission TM can select via which gear pair the torque of the crankshaft 2 is transmitted to the countershaft 17 by combining a state of each connection of the first clutch CL1 and the second clutch CL2 and positions of the first sleeve M1 to the third sleeve M3.

The reverse gear OR turnably journaled to the countershaft 17 forms a gear pair GR by being ordinarily engaged with an output gear for reverse travel not shown. The first clutch CL1 connects/disconnects the torque for a shift to the first, the third or the fifth speed and in the meantime, the second clutch CL2 connects/disconnects the torque for a shift to the second or the fourth speed and the reverse gear. Hereby, for example, when speed is sequentially shifted up from the first speed, a state of each connection of the first clutch CL1 and the second clutch CL2 is alternately switched.

Figure 4:
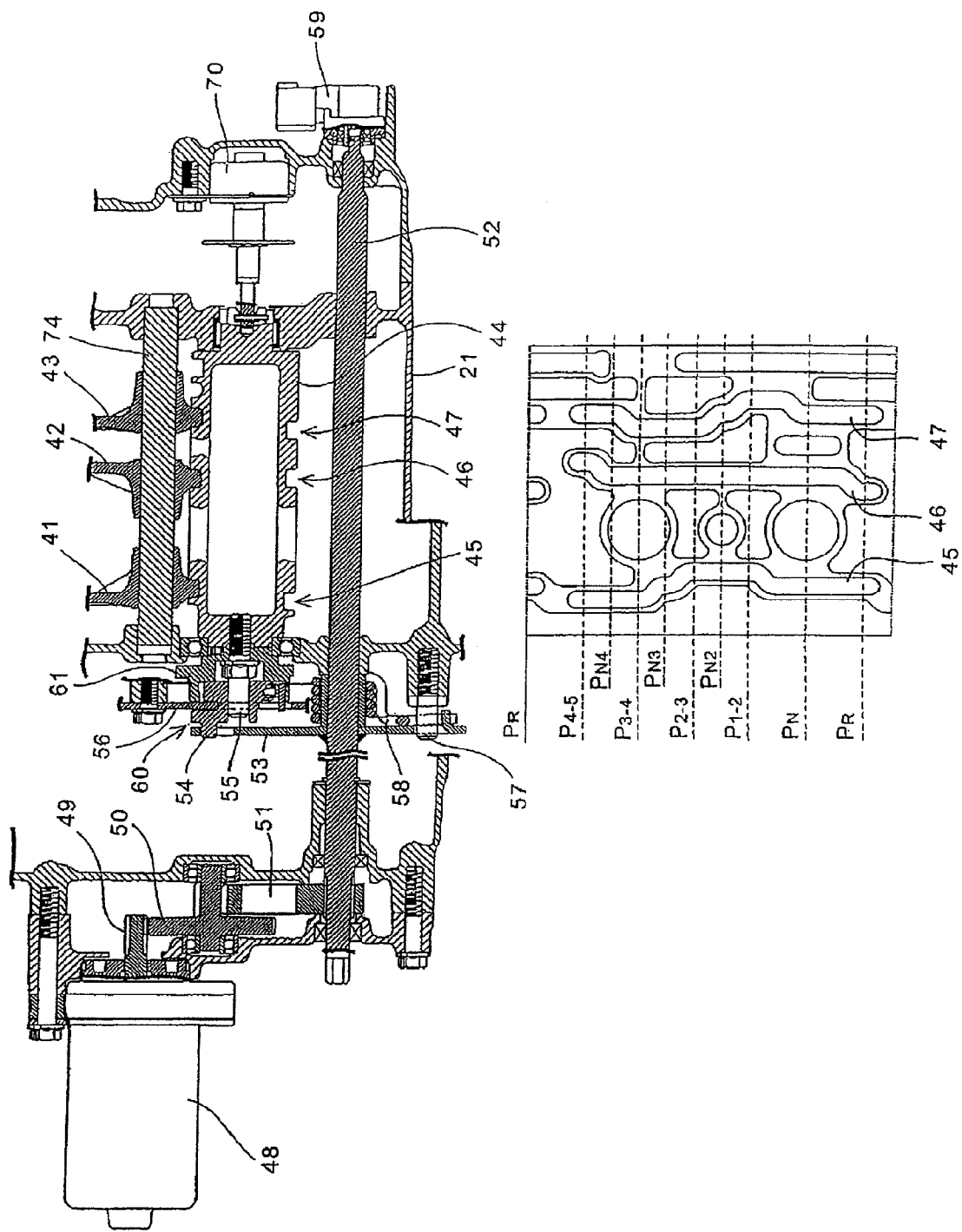
FIG. 4 shows a sectional view showing a shift mechanism and a development view showing a shift drum.

FIG. 4 shows a sectional view showing a shift mechanism of the transmission TM and a development view showing a shift drum 44. In the vicinity of the transmission TM, the hollow cylindrical shift drum 44 is rotatably journaled to the crankcase 21. The shift drum 44 is arranged in parallel with the axial direction of the transmission TM and lead grooves 45 to 47 into each of which a cylindrical projection formed at each lower end in drawing, of shift forks 41 to 43 is fitted are formed on a peripheral surface of the shift drum. The shift forks 41 to 43 are slidably fitted in an axial direction of a fork rod 74 arranged in parallel with the shift drum 44. Hereby, when the shift drum 44 is turned, the first sleeve M1 to the third sleeve M3 (see FIG. 3) fitted to each other end (not shown) of the shift forks 41 to 43 are slid in the axial direction.

Normally, turned positions corresponding to the number of speeds by 1 to 1 are set on the shift drum of the transmission, however, on the shift drum 44 in this embodiment, original turned positions are set according to the above-mentioned combination with the twin clutch TCL. Referring to the development view shown in FIG. 4, for the turned positions on the shift drum 44, P1-2 corresponding to the first to the second speed, P2-3 corresponding to the second to the third speed, P3-4 corresponding to the third to the fourth speed and P4-5 corresponding to the fourth to the fifth speed are set as a predetermined turned position, following PR corresponding to reverse travel and PN corresponding to a neutral position. This means that when the shift drum 44 is located in the predetermined turned position of P1-2 for example, a shift between the first and the second speeds is enabled by only switching a state of each connection of the first clutch CL1 and the second clutch CL2.

In this embodiment, PN2, PN3 and PN4 as a half-neutral position are set in the middle of each predetermined turned position of the shift drum 44. When the shift drum 44 is turned from P1-2 which is the predetermined turned position to the next predetermined turned position P2-3 in increasing order for example, the turning speed of the shift drum 44 is temporarily reduced because the half-neutral position PN2 is passed by setting these half-neutral positions. Hereby, a shift shock is reduced and a securer shift can be executed.

The shift drum 44 is turned by an electric motor 48 as an actuator the drive of which is controlled by a controller described later. The torque of the electric motor 48 is transmitted to a shift spindle 52 from an output shaft 49 via an intermediate gear 50 and a secuta gear 51. A plate type shift arm 53 is attached to the shift spindle 52 and when the shift arm 53 is once reciprocated by a predetermined angle in normal/reverse rotation, the shift drum 44 is turned in one direction by the predetermined angle via a pole ratchet mechanism 60.

A drum center 61 fixed to the shift drum 44 so that the drum center cannot be turned by a center bolt 55 is provided with a function of moderating operation for switching the predetermined turned position and the half-neutral position of the shift drum 44. The pole ratchet mechanism 60 is turnably held by a guide plate 56 fixed to the crankcase 21 and a shifter assembly 54 and one end of the shifter assembly 54 is fitted into a fitting hole formed in the shift arm 53. A return spring 58 that applies pressure in a direction in which the shift arm 53 is returned to an initial position is fitted between the shift spindle 52 and the guide pin 57. A shift position sensor 70 as position detecting means that detects the current speed based upon a turned position of the shift drum 44 is provided at a right end in drawing, of the shift drum 44 and a turning angle sensor 59 is attached to a right end of the shift spindle 52.

In the transmission TM in this embodiment, a so-called "preparatory shift" that the shift drum 44 is turned to the predetermined turned position according to the next speed beforehand in preparation for the next shift with the transmission of the torque maintained during running at predetermined shifted speed is enabled. This preparatory shift means operation for turning the shift drum 44 to the next predetermined turned position on the side of an up-shift beforehand in preparation for an up-shift to the next fourth speed after an up-shift from the second speed to the third speed is completed for example, and in the above-mentioned example, is equivalent to the turning of the shift drum 44 from P2-3 to P3-4 (see FIG. 4) during running at the third speed. As an up-shift is completed by only turning off the shift solenoid 25 at the same time as a shift instruction when the up-shift instruction to the fourth speed is output if only such a preparatory shift is executed, shifting time can be reduced. At the time of a down-shift, after a shift instruction of the down-shift is input, the turning of the shift drum 44 is started.

In switching from a neutral condition to a state in which the gears are engaged, the shift drum 44 is turned from PN to a position of P1-2 and a shift between the first speed and the second speed is enabled by only switching the engagement of the clutch. When the shift drum 44 is turned, the dog clutches (DC1, DC2) for the first speed and for the second speed are substantially simultaneously engaged in a state in which the two clutches are disengaged and the turning of the main shaft is stopped. Therefore, a state in which the dog tooth (the dowel) of the dog clutch is not smoothly fitted into the dog slit (the slit) is apt to occur. The shift controller equivalent to this embodiment prevents the above-mentioned state in switching from the neutral condition to the state in which the gears are engaged from occurring by the oil pressure control of the clutch.

Figure 5:
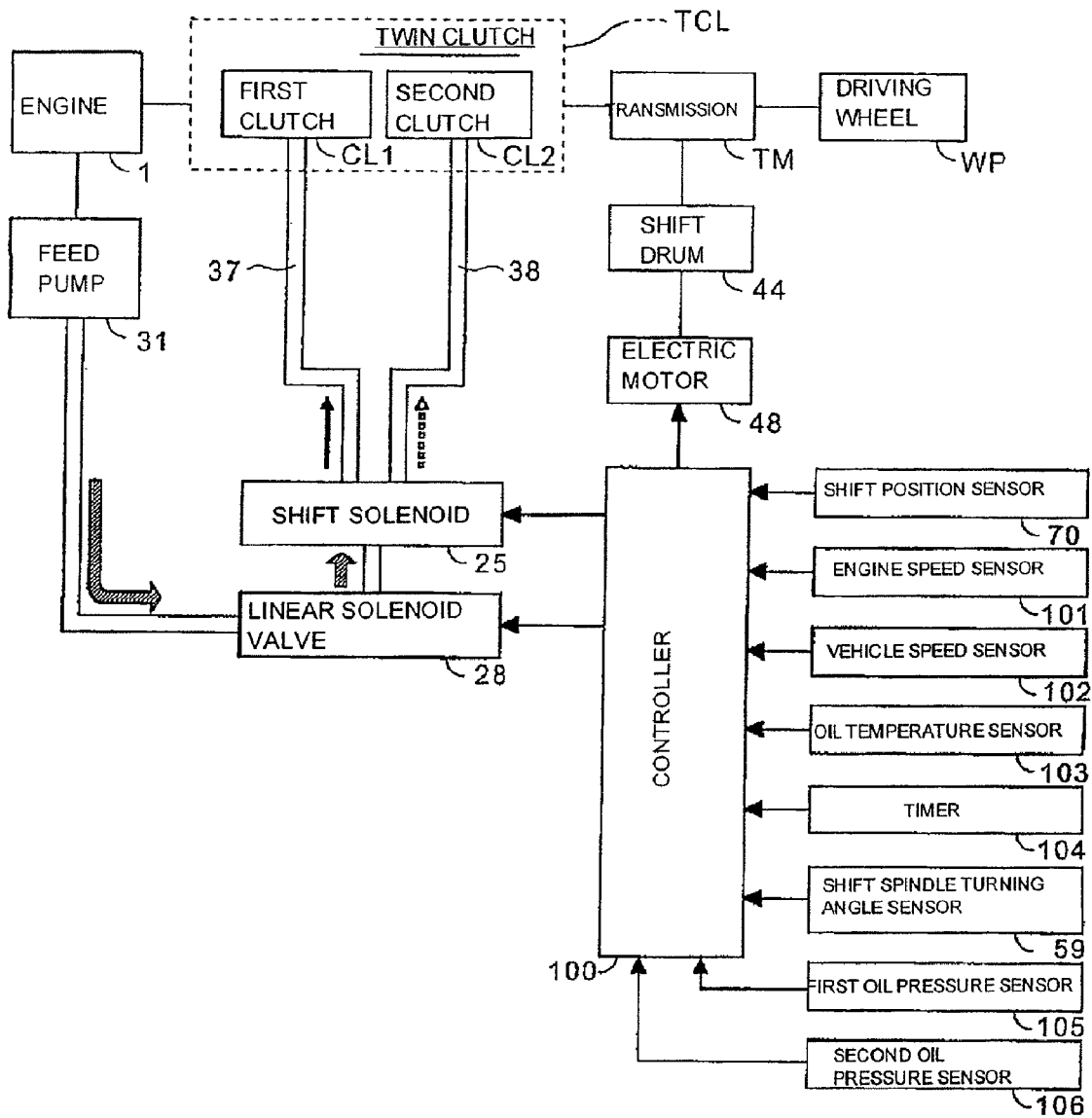
FIG. 5 is a block diagram showing the configuration of the shift controller equivalent to this embodiment.

FIG. 5 is a block diagram showing the configuration of the shift controller equivalent to this embodiment. The same reference numeral as the above-mentioned one denotes the same or the similar part. The transmission TM functions as an automatic or a semi automatic transmission to which an occupant gives an instruction for a shift by operating a switch by instructing the controller 100 to control the drive of the shift solenoid 25, the linear solenoid valve 28 and the electric motor 48. Hereby, the torque of the engine 1 is transmitted to a driving wheel WP after deceleration at predetermined shift stages of the transmission TM.

The controller 100 can control the timing and the velocity of the connection/the disconnection of the twin clutch TCL, the driving timing and the driving velocity of the shift drum 44 according to various running conditions. A signal output from various sensors including a shift position sensor 70 that detects a turned position of the shift drum 44, an engine speed sensor 101 that detects the revolution speed of the engine 1, a vehicle speed sensor 102 that detects the running speed of a vehicle, an oil temperature sensor 103 that detects the temperature of lubricating oil of the engine, a timer 104 that measures various predetermined time calculated in the controller 100, the shift spindle turning angle sensor 59 that detects a turning angle of the shift spindle 52, and a first oil pressure sensor 105 and a second oil pressure sensor 106 that respectively detect oil pressure generated in the first clutch CL1 and in the second clutch CL2 is input to the controller 100.

Figure 6:
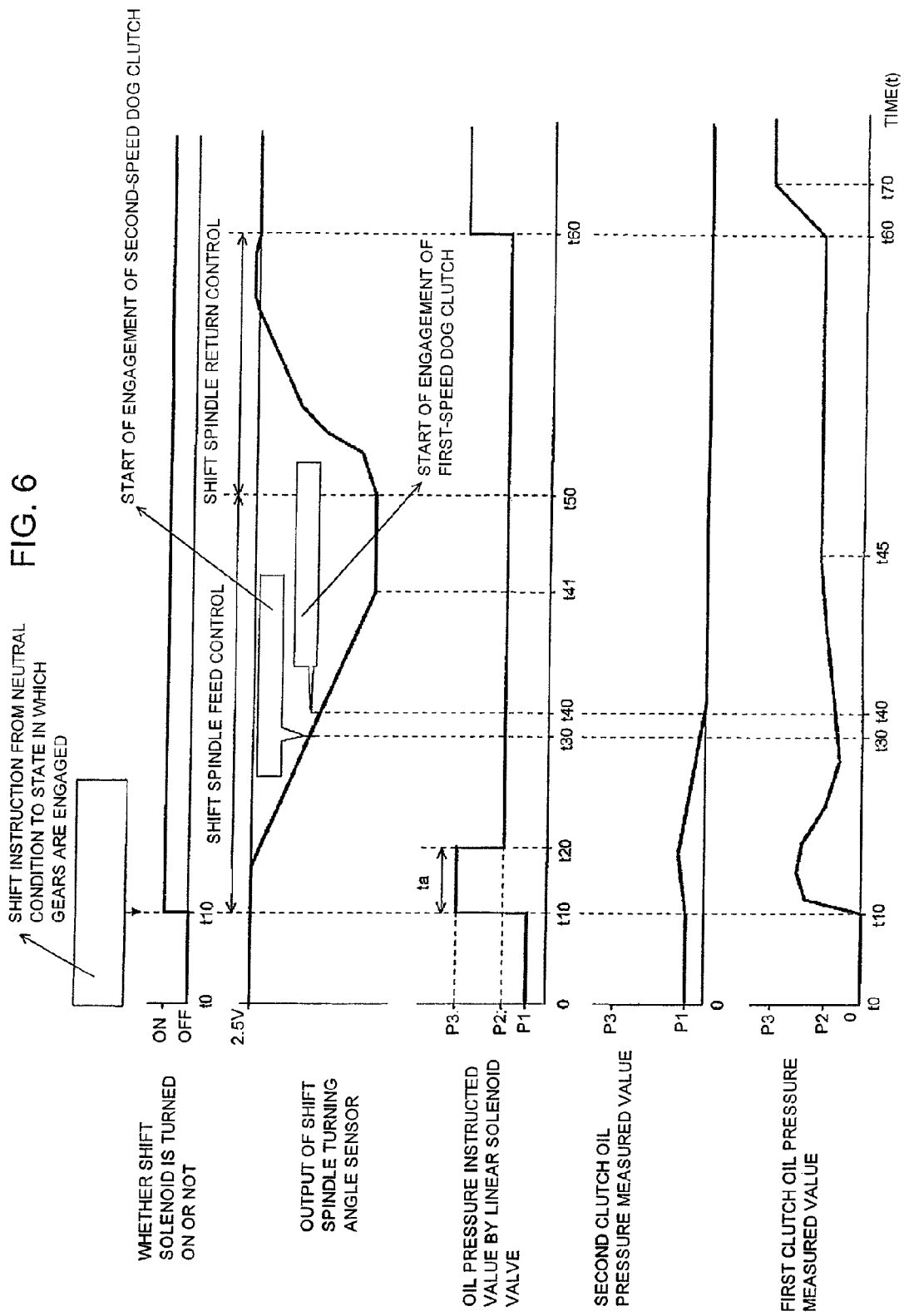
FIG. 6 is a timing chart showing a procedure for clutch control by the shift controller equivalent to this embodiment.

FIG. 6 is a timing chart showing a procedure for clutch control by the shift controller equivalent to this embodiment. In FIG. 6, in order from the upside, an on-off condition of the shift solenoid 25, an output signal from the shift spindle turning angle sensor 59, an oil pressure instructed value by the linear solenoid valve 28, an oil pressure measured value of the second clutch CL2 and an oil pressure measured value of the first clutch CL1 are shown. The shift spindle turning angle sensor 59 outputs 2.5 V when a turning angle is zero, that is, the shift spindle is located in an initial position and an output value decreases as the turning angle increases.

As described above, in the transmission TM, the first clutch CL1 connects/disconnects the torque of the inner main shaft 16 that supports odd-numbered transmission gears (the first, the third and the fifth speed) and the second clutch CL2 connects/disconnects the torque of the outer main shaft 15 that supports even-numbered transmission gears (the second and fourth speed). Therefore, in switching from the neutral condition to the state in which the gears are engaged, the shift solenoid 25 is turned on and a destination of supply oil pressure is switched to the first clutch so as to prepare for starting at the first speed.

Referring to the timing chart, a flow of clutch control by the shift controller equivalent to this embodiment will be described in detail below. First, at time t0, the transmission TM is in the neutral condition, that is, in a state in which no dog clutch corresponding to each speed is engaged. At this time, slight predetermined oil pressure P1 is supplied to the linear solenoid valve 28 and hereby, the predetermined oil pressure P1 is generated in the second clutch CL2. The predetermined oil pressure P1 is set to an extent (for example, 10% of a state in which the clutch is completely engaged) that the second clutch CL2 is slightly engaged and the outer main shaft 15 is turned together by the torque of the crankshaft 2. The starting clutch 10 (see FIGS. 1 and 2) provided between the crankshaft and the main shaft (the inner main shaft 16 and the outer main shaft 15) is set so that the starting clutch transmits the torque to an extent that the main shaft is turned together even if engine speed is lower than the number of connected revolutions of the starting clutch 10.

Next, at time t10, when a shift instruction from the neutral condition (PN) to the state in which the gears are engaged (P1-2) is output, the controller 100 turns on the shift solenoid 25, switches a destination of supply oil pressure to the first clutch CL1, and switches an oil pressure instructed value by the linear solenoid valve 28 from P1 to P3. Hereby, the supply of oil pressure having P3 as a target value to the first clutch CL1 is started. In this embodiment, the oil pressure P3 larger than the predetermined oil pressure P1 is set to maximum oil pressure which the linear solenoid valve 28 can supply or an extent that the clutch is completely engaged so as to promptly increase the oil pressure of the first clutch CL1. The shift instruction at the time t10 is executed by the controller 100 based upon output signals from various sensors and the operation of a shift button by an occupant.

The supply of the oil pressure P3 started at the time t10 is continued till time t20 at which predetermined time ta (for example, 50 msec) elapses. Hereby, the oil pressure of the first clutch CL1 is rapidly increased up to a value slightly lower than the oil pressure P3 during this period and the inner main shaft 16 is promptly turned together by the torque of the crankshaft.

In the meantime, the supply of oil pressure to the outer main shaft 15 turned together with the crankshaft when the predetermined oil pressure P1 is supplied to the second clutch CL2 is stopped at the time t10 and further, even after the predetermined time ta elapses, a state in which the outer main shaft is turned together is continued by inertia force. Hereby, a state in which both the inner main shaft 16 and the outer main shaft 15 are turned together with the crankshaft can be acquired in a predetermined period after the time t10.

The reason why an oil pressure value of the second clutch CL2 slightly rises after the time t10 is that the discrepancy of synchronism based upon the viscosity of working fluid between pressure governing timing by the linear solenoid valve 28 and the operating timing of the shift valve 25 occurs when the temperature of the working fluid of the clutch is low and the viscosity thereof is high. Therefore, when oil temperature is high and the viscosity is low, such rise does not occur and a fall starts at the same time as the time t10 comes.

The oil pressure instructed value by the shift solenoid valve 28 is switched to P2 (for example, 50% of P3) smaller than the oil pressure P3 at the time t20. Hereby, the oil pressure of the first clutch CL1 starts a fall. According to such an oil pressure supply procedure to the first clutch CL1, the inner main shaft 16 is promptly turned together by supplying the maximum oil pressure P3 in only the predetermined time ta since the time t10 and noise and others when the dog clutch for the first speed is engaged can be reduced by making the engagement of the clutch weak from the time t20.

The predetermined time ta is determined based upon the temperature of the working fluid of the clutch. The controller 100 is provided with a data table not shown set so that when oil temperature is low and the viscosity is high, the predetermined time ta is extended and when oil temperature is high, the predetermined time ta is reduced. The predetermined time ta is measured by the timer 104 (see FIG. 5).

The shift drum 44 driven by the shift spindle 52 starts turning slightly behind the time t10. The transmission TM in this embodiment is set so that the dog clutch DC2 for the second speed starts engagement slightly earlier than the dog clutch DC1 for the first speed. At time t30, the engagement of the dog clutch DC2 for the second speed is started and at the next time t40, the engagement of the dog clutch DC1 for the first speed is started.

In this embodiment, the reason why for oil pressure supplied to both clutches so as to acquire a state in which the main shaft is turned together, oil pressure supplied to the first clutch CL1 is set to a larger value than that to the second clutch CL2 is to relatively turn the inner main shaft 16 and the countershaft 17 against frictional force generated between an end of the dog tooth and the side of the gear so as to settle the above-mentioned state even if the dog clutch DC1 for the first speed is turned in the state in which the dog tooth of the dog clutch is not smoothly fitted into the dog slit with the dog clutch DC2 for the second speed engaged earlier.

According to the above-mentioned clutch control, at least till the time t40, both the inner main shaft 16 and the outer main shaft 15 are turned together with the crankshaft. In this state, as the inner and outer main shafts 15, 16 are relatively turned differently from the stopped countershaft, the dog clutches DC1, DC2 for the first speed and for the second speed can be smoothly engaged.

In the transmission TM in this embodiment, as it is set that the dog clutch DC2 for the second speed is engaged earlier than the dog clutch DC1 for the first speed, the engagement of the dog clutch DC2 for the second speed while the turning together of the outer main shaft 15 lasts by inertia force is facilitated. As a process for turning the inner main shaft 16 together is executed after a process for turning the outer main shaft 15 together and the first clutch CL1 is engaged as it is, a destination of supply oil pressure is not required to be switched again in starting with the gear for the first speed and smooth clutch control is enabled.

After the engagement of the dog clutch DC1 for the first speed is started at the time t40, the shift spindle 52 reaches a turning critical position at time t41. Therefore, when a lost motion mechanism between the shift spindle 52 and the shift drum 44 is not operated, it can be estimated that the shift drum 44 reaches the next predetermined turned position P1-2 at this time.

The oil pressure of the first clutch CL1 reaches P2 at time t45. Afterward, between time t50 and t60, shift spindle return control for returning the shift spindle 52 to an initial position is executed. In this embodiment, when an oil pressure instructed value by the linear solenoid valve 28 is set to P3 again at the time t60, the oil pressure of the first clutch CL1 reaches P3 at time t70 as a result to be in a completely engaged state. As the starting clutch is provided between the crankshaft and the main shaft to the engine 1 (see FIGS. 1 and 2) in this embodiment, the torque is not transmitted by only the engagement of the first clutch CL1. When engine speed exceeds a predetermined value in this state and the starting clutch is engaged, the torque is transmitted to the selected gear for the first speed and the vehicle is started.

Figure 7:
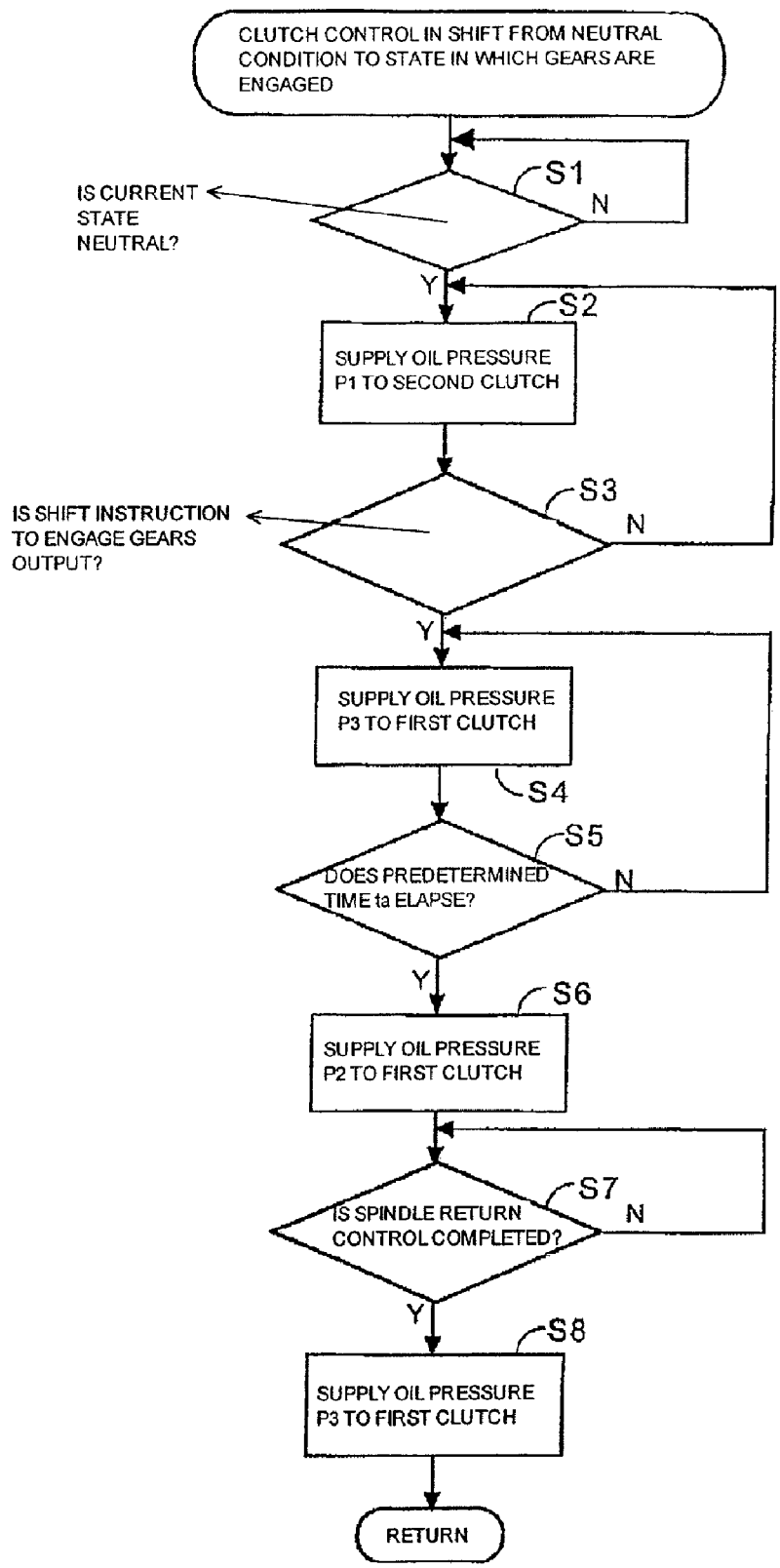
FIG. 7 is a flowchart showing a flow of the clutch control in this embodiment.

FIG. 7 is a flowchart showing a flow of clutch control in a shift in this embodiment. This flowchart corresponds to the timing chart shown in FIG. 6 and is executed by the controller 100. First, in a step S1, it is determined whether the transmission TM is in a neutral condition or not. When it is determined in the step S1 that the transmission is in the neutral condition, the supply of predetermined oil pressure P1 to the second clutch CL2 is started. Hereby, the outer main shaft 15 starts to be turned together with the crankshaft. When negative determination is made in the step S1, control is returned to determination in the step S1.

In the next step S3, it is determined whether a shift instruction to engage the gears is output or not. When it is determined in the step S3 that the shift instruction is output, control proceeds to a step S4 and maximum oil pressure, that is, P3 as oil pressure for switching the clutch to a completely engaged state is supplied to the first clutch CL1. Hereby, the inner main shaft 16 starts to be turned together with the crankshaft. When negative determination is made in the step S3, control is returned to the step S2.

In a step S5, it is determined whether elapsed time since the shift instruction is output reaches predetermined time ta or not. When it is determined in the step S5 that the elapsed time reaches, control proceeds to a step S6 and oil pressure supplied to the first clutch CL1 is switched to P2 equivalent to approximately a half of P3. The shift drum 44 smoothly engages the dog clutches for the first speed and for the second speed by a series of clutch oil pressure control while both the inner main shaft 16 and the outer main shaft 15 are turned together with the crankshaft and is turned from PN in the neutral condition to P1-2 in a state in which the gears are engaged. When negative determination is made in the step S5, control is returned to the step S4.

In a step S7, it is determined whether spindle return control is completed or not, when it is determined that the control is completed, control proceeds to a step S8, oil pressure supplied to the first clutch CL1 is switched to P3, preparation for starting at the first speed is completed, and a series of control is finished. When negative determination is made in the step S7, control is returned to determination in the step S7.

As described above, according to the shift controller according to the present invention, in the neutral condition, the predetermined oil pressure P1 is supplied to the second clutch CL2, the outer main shaft 15 is turned together with the crankshaft, and when the shift instruction to engage the gears is output, the inner main shaft 16 can be promptly turned together by supplying the maximum oil pressure P3 to the first clutch CL1. Hereby, a period in which both the inner main shaft 16 and the outer main shaft 15 are turned together with the crankshaft is provided, and even if both the dog clutch DC1 for the first speed and the dog clutch DC2 for the second speed are engaged when the shift drum 44 is turned from the neutral condition PN to the predetermined turned position P1-2, the state in which the dog tooth is not smoothly fitted into the dog slit is prevented from occurring and the smooth shift is enabled.

Figure 8:
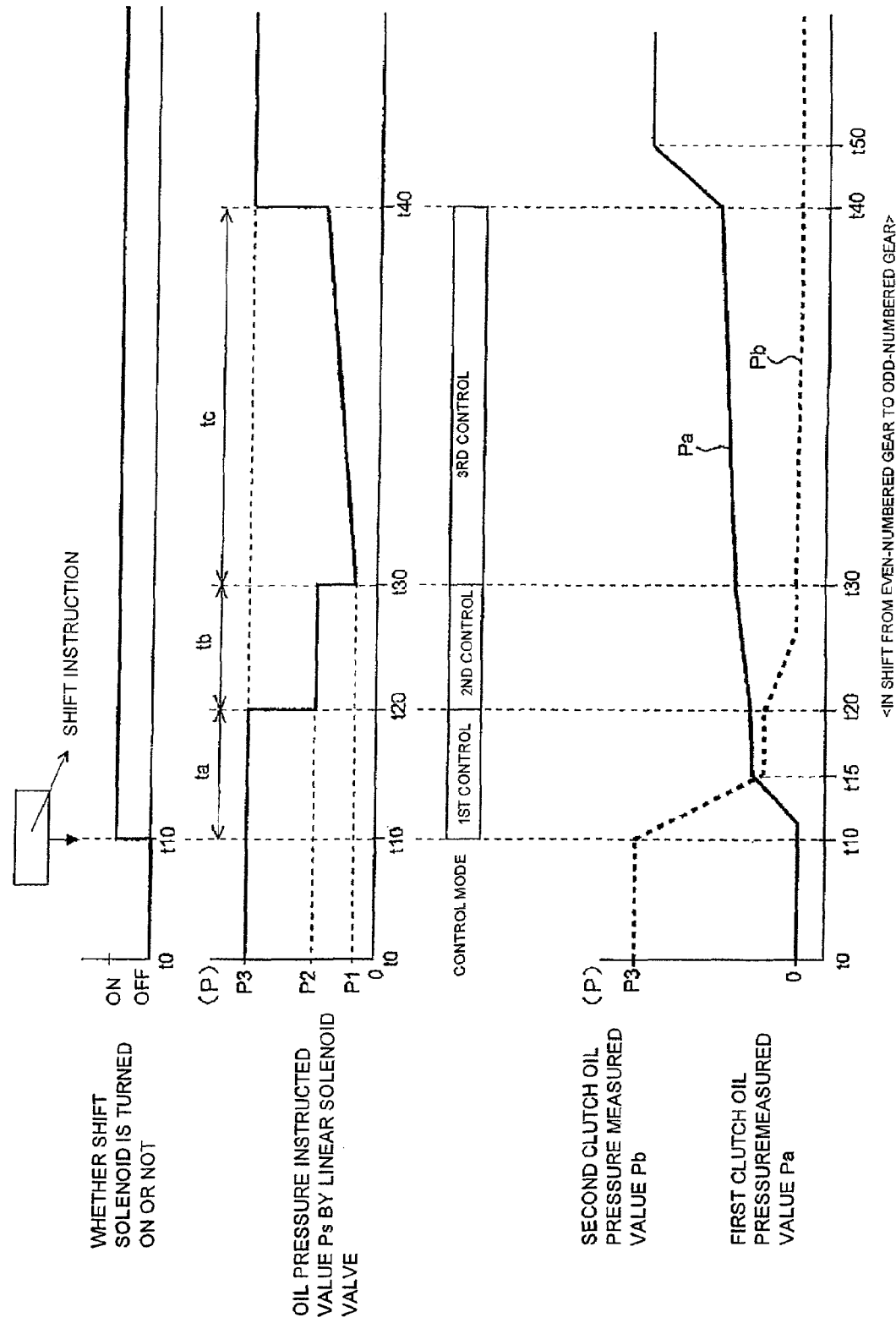
FIG. 8 is a timing chart showing a procedure for clutch control by the shift controller equivalent to this embodiment.

FIG. 8 is a timing chart showing a procedure for clutch control by the shift controller equivalent to this embodiment. In FIG. 8, in order from the upside, an on/off state of the shift solenoid 25, an oil pressure instructed value Ps to the linear solenoid valve 28, control modes (first, second and third control) over the linear solenoid valve 28, an oil pressure measured value Pb of the second clutch CL2 and an oil pressure measured value Pa of the first clutch CL1 are shown. The timing chart is referred in a shift from even-numbered speed to odd-numbered speed and a case that a shift is made to the third speed during running at the second speed will be described for an example below.

As described above, the transmission TM is configured so that the torque transmitted to the inner main shaft 16 that supports the odd-numbered transmission gears (the first, the third and the fifth speed) is connected/disconnected by the first clutch CL1 and the torque transmitted to the outer main shaft 15 that supports the even-numbered transmission gears (the second and the fourth speed) is connected/disconnected by the second clutch CL2. Hereby, in switching from the even-numbered speed to the odd-numbered speed, the shift solenoid 25 is turned on from off and a destination of supply oil pressure from the linear solenoid valve 28 is switched from the second clutch CL2 to the first clutch CL1.

First, at time t0 during running with the second-speed gear engaged, the shift solenoid 25 is turned off and the second clutch CL2 to which maximum oil pressure P3 is supplied is completely connected. At time t10, when a shift instruction from the second speed to the third speed is output, the controller 100 turns on the shift solenoid 25 and switches the destination of supply oil pressure to the first clutch CL1. The oil pressure Pb of the second clutch CL2 immediately starts to decrease by switching the destination of supply oil pressure and in the meantime, the oil pressure Pa of the first clutch CL1 starts to increase with the increase slightly delayed. The shift instruction at the time t10 is executed by the controller 100 based upon output signals from various sensors and the operation of a shift button by an occupant.

As described above, the twin clutch TCL in this embodiment is configured so that the hydraulic piston B1, B2 (see FIG. 3) is slid against the pressure of the clutch spring by supplying oil pressure to the first clutch CL1 or the second clutch CL2, hereby, the hydraulic piston B1, B2 presses the clutch plate means and the clutch is connected. Therefore, when the supply of oil pressure is stopped, the hydraulic piston B1, B2 is returned to an initial position by the pressure of the clutch spring and the clutch is disconnected.

Because of this configuration, an ineffective stroke equivalent to quantity in which the hydraulic piston B1, B2 is slid exists in the first clutch CL1 or the second clutch CL2 until frictional force is generated in the clutch plate since the supply of oil pressure is started. However, according to clutch control in this embodiment, in switching the destination of supply oil pressure in a shift, the ineffective stroke of the first clutch CL1 can be reduced up to the shortest time by executing the first control in which time when maximum oil pressure (first oil pressure) P3 is supplied to the first clutch CL1 is predetermined time ta (first predetermined time).

Figure 9:
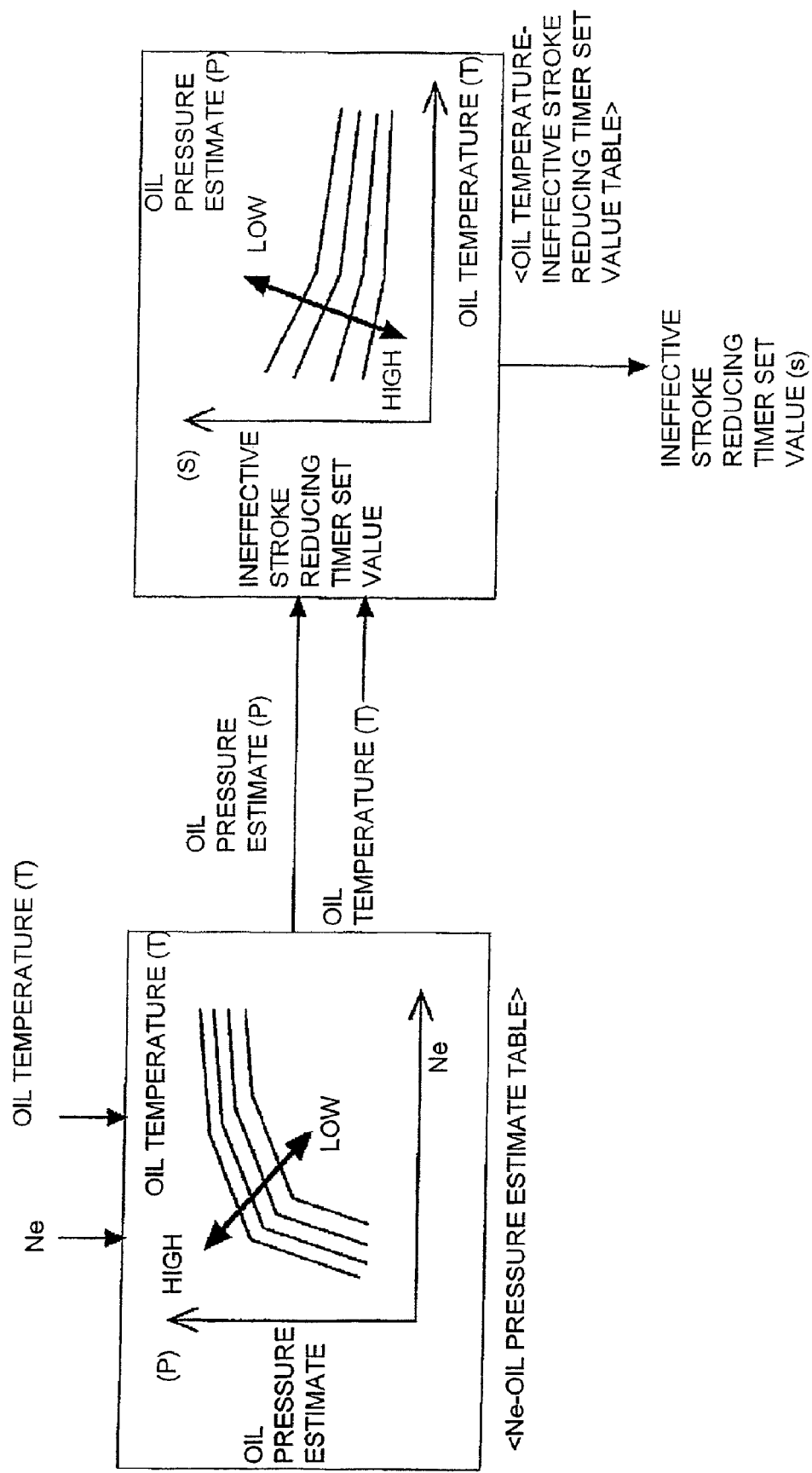
FIG. 9 shows a data table for deriving a set value of a timer for reducing an ineffective stroke.

According to the shift instruction at the time t10, the timer 104 starts the measurement of the predetermined time ta. The predetermined time ta (for example, 50 msec) is derived using two data tables shown in FIG. 7. Referring to FIG. 9, to derive the predetermined time ta, first, engine speed Ne and oil temperature T detected by the engine speed sensor 101 and the oil temperature sensor 103 are applied to an Ne-oil pressure estimate table and an oil pressure estimate P equivalent to maximum pressure which the feed pump 31 (see FIG. 2) can supply is derived.

Plural graphs showing relation between the engine speed Ne and the oil pressure estimate P are provided to the data tables every oil temperature and the oil pressure estimate P considering the variation of viscosity according to the variation of oil temperature can be derived. In this embodiment, the oil pressure estimate P is set so that the higher oil temperature T is, the higher the oil pressure estimate P is. According to these data tables for deriving the oil pressure estimate P, an oil pressure sensor for detecting maximum oil pressure generated in the feed pump 31 is not required, the number of parts of the shift controller is reduced, and the configuration can be simplified.

Next, the oil pressure estimate P and the oil temperature T are applied to an oil temperature-ineffective stroke reducing timer set value table and an ineffective stroke reducing timer set value S is derived. Plural graphs showing relation between the oil temperature T and the ineffective stroke reducing timer set value S are provided to this data table every oil pressure estimate and the ineffective stroke reducing timer set value S considering the available pressure supply of the feed pump 31 can be derived. In this embodiment, the ineffective stroke reducing timer set value S is set so that the higher the oil pressure estimate P is, the smaller the ineffective stroke reducing timer set value S is. A process for deriving the predetermined time ta is executed when the shift instruction is output and in addition, can be set so that the process is repeatedly executed during running at predetermined speed.

As shown in the timing chart in FIG. 8 again, the first control started at the time t10 is continued till time t20 at which predetermined time ta elapses. The lowering speed of a second clutch oil pressure measured value Pb that falls according to the start of the first control is greatly slowed down at time t15. This reason is that working fluid easily comes out from a cylinder of the hydraulic piston because supplied oil pressure is released in a state in which the pressure of the clutch spring is strong immediately after the destination of supply oil pressure is switched, however, afterward, when the hydraulic piston is returned to the initial position with weakened pressure, velocity at which the working fluid comes out is reduced because an oil passage for supplying the working fluid has only a small diameter.

In the meantime, the climbing speed of a first clutch oil pressure measured value Pa that starts to rise according to the start of the first control is also greatly slowed down at the time t15. This reason is that oil pressure is easily raised because working fluid is injected into a vacant cylinder immediately after the supply of the oil pressure is started, however, afterward, when the oil pressure is raised from a state in which the cylinder is filled with the working fluid, the velocity is slowed down.

Next, between time t20 and t30, the second control in which second oil pressure P2 is supplied in only second predetermined time tb is executed. According to the second control, even if there is dispersion among ineffective strokes of the clutch due to an error among products and others, the dispersion is absorbed by supplying the oil pressure P2 (for example, 50% of P3) lower than oil pressure P3 applied in the first control and the ineffective strokes can be securely reduced. The second oil pressure P2 is a preset value, a process for calculating a value of oil pressure is not required, and a load of operation can be reduced. Second predetermined time tb applied in the second control can be calculated by multiplying the predetermined time ta by a predetermined coefficient based upon the predetermined time ta derived from the data tables shown in FIG. 9. Further, a dedicated data table for deriving the second predetermined time tb may be also provided and a process for deriving the second predetermined time tb may be also executed after a shift instruction is output.

Between the next time t30 and t40, the third control in which a value of supplied oil pressure is gradually raised in predetermined time tc from third oil pressure P1 (for example, 10% of the oil pressure P3) lower than the second oil pressure P2 is executed. According to the third control, a shift can be smoothly completed by gradually shifting the first clutch CL1 into a connected state after an ineffective stroke reducing process at two stages by the first control and the second control is completed. As the third oil pressure P1 in this embodiment is a preset value, a load for operation can be reduced.

The third predetermined time tc is calculated based upon the predetermined time ta as the second predetermined time tb, however, the third predetermined time may be also derived using a dedicated data table. A rate of a climb from the third oil pressure P1 is a preset fixed value, however, it may be also determined by feedback control based upon a change of the first clutch oil pressure measured value Pa. Further, the third oil pressure P1, the third predetermined time tc and the rate of the climb from the oil pressure P1 can be also set in consideration of the number of speeds in a shift.

At time t40 at which the third control is finished, an oil pressure instructed value Ps of the linear solenoid valve 28 is switched to P3 which is maximum oil pressure. Hereby, the oil pressure measured value Pa of the first clutch CL1 reaches the maximum oil pressure P3 at time t50 slightly delayed from the time t40 and the first clutch is turned completely engaged. In this embodiment, the example in the shift from the even-numbered speed to the odd-numbered speed is described, however, in a shift from odd-numbered speed to even-numbered speed (for example, in a shift from the third speed to the fourth speed), the similar ineffective stroke reducing control can be also executed.

Figure 10:
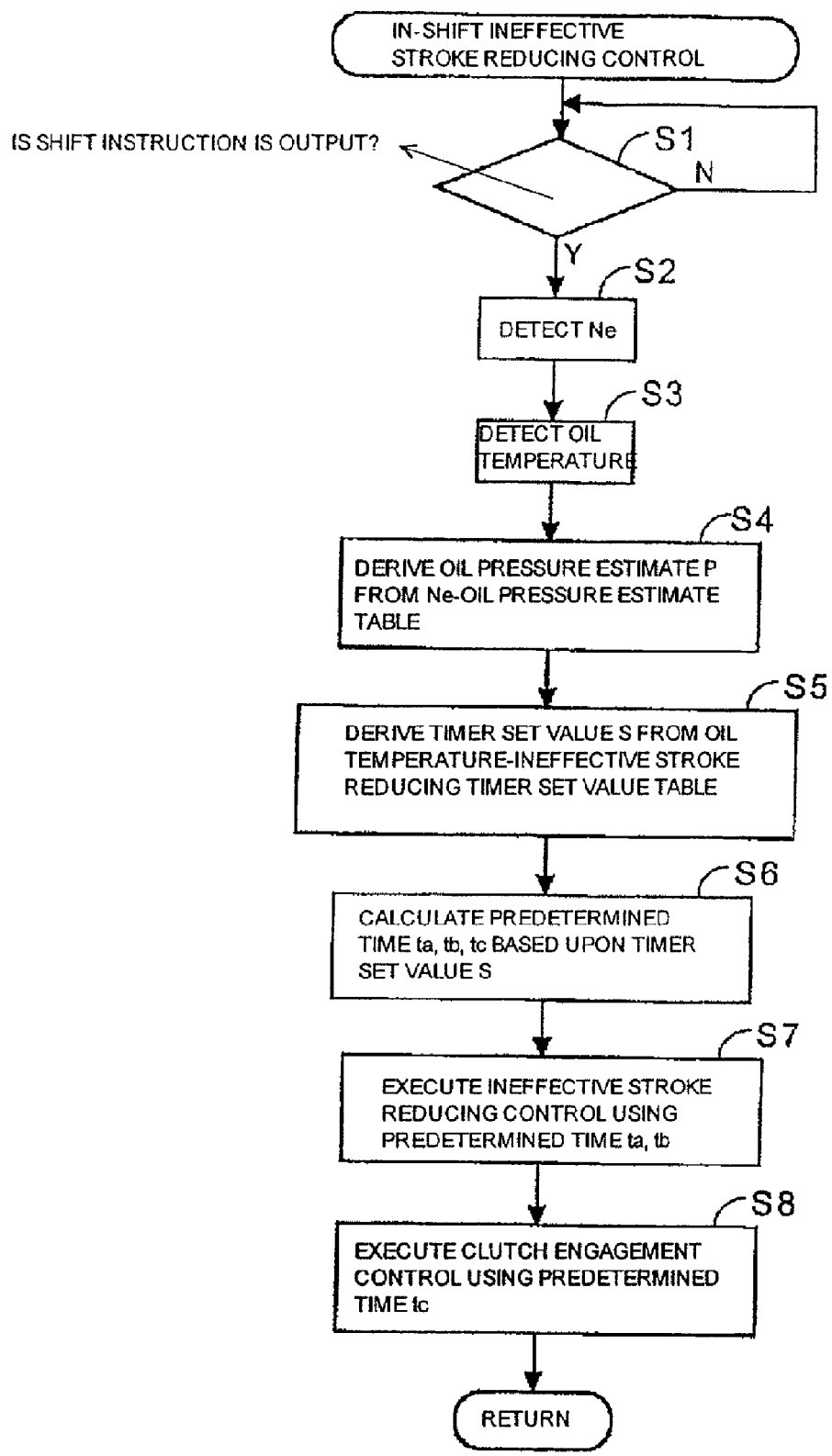
FIG. 10 is a flowchart showing a flow of in-shift ineffective stroke reducing control in this embodiment.

FIG. 10 is a flowchart showing a flow of clutch control in this embodiment. This flowchart corresponds to the timing chart shown in FIG. 8 and the clutch control is executed by the controller 100. First, in a step S1, it is determined whether a shift instruction for an up-shift is output by the operation of an occupant and others or not. When it is determined in the step S1 that the shift instruction is output, engine speed Ne is detected in a step S2 and in the next step S3, oil temperature T is detected. When it is determined in the step S1 that the shift instruction is not output, control is returned to the step S1.

In a step S4, an oil temperature estimate P is derived by applying the engine speed Ne and the oil temperature T to the Ne-oil temperature estimate table shown in FIG. 7. In the next step S5, an ineffective stroke reducing timer set value S is derived by applying the oil pressure estimate P and the oil temperature T to the oil temperature-ineffective stroke reducing timer set value table.

When the timer set value S is derived in the step S5, the first predetermined time ta, the second predetermined time tb and the third predetermined time tc as each execution time of the first, second and third control are calculated based upon the timer set value S in a step S6. Next, in a step S7, ineffective stroke reducing control configured by the first control and the second control is executed using the predetermined time ta, tb. In a step S8, clutch engagement control is executed using the predetermined time tc and a series of control is finished.

As described above, according to the shift controller according to the present invention, as the shift solenoid 25 is driven and the destination of supply oil pressure is switched to the other clutch when a shift instruction is output while predetermined speed is selected and the maximum oil pressure P3 is supplied to either of the first clutch CL1 or the second clutch CL2 and the first control in which the maximum oil pressure P3 is supplied to the other clutch in only the predetermined time ta is executed, an ineffective stroke of the other clutch can be reduced up to the shortest time. A shift shock can be reduced without extending time until a shift is completed by supplying the maximum oil pressure P3 in only ta. Further, a process for reducing an ineffective stroke is executed at two stages of maximum velocity and velocity lower than the maximum velocity by executing the second control in which the second oil pressure P2 smaller than the maximum oil pressure P3 is supplied in only the second predetermined time tb after the predetermined time ta elapses, and the ineffective stroke can be securely reduced.

The configuration of the transmission and the transmission mechanism, the setting of the predetermined time ta, the setting of the predetermined oil pressure P1, P2, P3 and others are not limited to the above-mentioned embodiment and various changes are allowed. For example, in the neutral condition, oil pressure is supplied to the first clutch and oil pressure may be also supplied to the second clutch according to a shift instruction to engage the gears. Further, in switching the neutral condition to the state in which the gears are engaged, the dog clutch for the first speed may be also engaged earlier and the dog clutches for the first speed and for the second speed may be also substantially simultaneously engaged. The clutch control according to the present invention can be applied to various transmissions in which a destination of supply oil pressure is switched between a first clutch and a second clutch. For example, a transmission may be also configured so that it supports even-numbered gears by an inner main shaft and supports odd-numbered gears by an outer main shaft.

In addition, the clutch control according to the present invention can be applied to various transmissions that switch a destination of supply oil pressure between a first clutch and a second clutch. For example, a transmission may be also configured so that even-numbered transmission gears are supported by an inner main shaft and odd-numbered transmission gears are supported by an outer main shaft. The shift controller according to the present invention can be applied to a motorcycle and a three-wheeled vehicle in addition to a four-wheel ATV.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift controller of a twin clutch type transmission comprising: the transmission having a plurality of gear pairs according to speed between a main shaft and a countershaft; and a twin clutch configured by a first clutch and a second clutch respectively arranged on the main shaft, and in which torque of an engine is connected/disconnected between the engine and the transmission by the twin clutch, wherein the main shaft is configured by a first main shaft that supports a plurality of gears for odd-numbered speeds and a second main shaft that supports a plurality of gears for even-numbered speeds;

the first clutch connects/disconnects the torque transmitted to the first main shaft and the second clutch connects/disconnects the torque transmitted to the second main shaft;

the transmission is so configured that when a shift drum is turned to a predetermined position, a dog clutch for first speed that transmits torque of a first-speed gear and a dog clutch for second speed that transmits torque of a second-speed gear are both engaged with a predetermined gear;

the shift controller includes:

single oil pressure supply means that supplies oil pressure for connecting the twin clutch;

oil pressure supply destination switching means that switches a destination of oil pressure supplied from the oil pressure supply means between the first clutch and the second clutch; and a controller that controls oil pressure supplied to the twin clutch and turning of the shift drum; and the controller supplies a predetermined oil pressure (P1) to either of the first clutch or the second clutch in neutral and turns either corresponding to one clutch of the first main shaft or the second main shaft, starts the turning of the shift drum to the predetermined position when a shift instruction from the neutral condition to a state in which the gears are engaged is output, instructs the switching means to switch a destination of supply oil pressure to the other of the first clutch or the second clutch and supplies another oil pressure (P3) which is larger than the predetermined oil pressure (P1) to the other clutch during predetermined time until the other of the first main shaft or the second main shaft is turned, wherein the predetermined time is finished before timing at which the dog clutch for first speed and the dog clutch for second speed are engaged.

2. The shift controller according to claim 1, wherein the another oil pressure (P3) which is larger than the predetermined oil pressure (P1) is a maximum oil pressure (P3) by the oil pressure supply means.

3. The shift controller according to claim 2, wherein after the predetermined time elapses, an oil pressure (P2) smaller than the maximum oil pressure (P3) and larger than the predetermined oil pressure (P1) is supplied.

4. The shift controller according to claim 1, wherein after the predetermined time elapses, an oil pressure (P2) smaller than the maximum oil pressure (P3) and larger than the predetermined oil pressure (P1) is supplied.

5. The shift controller according to claim 1, wherein the clutch that supplies the predetermined oil pressure (P1) in the neutral is the second clutch.

6. The shift controller according to claim 2, wherein the clutch that supplies the predetermined oil pressure (P1) in the neutral is the second clutch.

7. controller of a twin clutch type transmission comprising:
the transmission having a plurality of gear pairs according to speed between a main shaft and a countershaft; and a twin clutch configured by a first clutch and a second clutch respectively arranged on the main shaft, and in which torque of an engine is connected/disconnected between the engine and the transmission by the twin clutch,
wherein the main shaft is configured by a first main shaft that supports a plurality of gears for odd-numbered speeds and a second main shaft that supports a plurality of gears for even-numbered speeds;
the first clutch connects/disconnects the torque transmitted to the first main shaft and the second clutch connects/disconnects the torque transmitted to the second main shaft;
the transmission is so configured that when a shift drum is turned to a predetermined position, a dog clutch for first speed that transmits torque of a first-speed gear and a dog clutch for second speed that transmits torque of a second-speed gear are both engaged with a predetermined gear;
the shift controller includes:
single oil pressure supply means that supplies oil pressure for connecting the twin clutch;
oil pressure supply destination switching means that switches a destination of oil pressure supplied from the oil pressure supply means between the first clutch and the second clutch; and
a controller that controls oil pressure supplied to the twin clutch and turning of the shift drum; and
the controller supplies a predetermined oil pressure (P1) to either of the first clutch or the second clutch in neutral and turns either corresponding to one clutch of the first main shaft or the second main shaft, starts the turning of the shift drum to the predetermined position when a shift instruction from the neutral condition to a state in which the gears are engaged is output, instructs the switching means to switch a destination of supply oil pressure to the other of the first clutch or the second clutch and supplies another oil pressure (P3) which is larger than the predetermined oil pressure (P1) to the other clutch during predetermined time until the other of the first main shaft or the second main shaft is turned, and
further comprising:
an oil temperature sensor that detects the temperature of oil supplied to the clutch; and
a data table for deriving the predetermined time based upon the oil temperature.

8. The shift controller according to claim 7, wherein the predetermined time is finished before timing at which the dog clutch for first speed and the dog clutch for second speed are engaged.

9. The shift controller according to claim 7, wherein the clutch that supplies the predetermined oil pressure (P1) in the neutral is the second clutch.

* * * * *